Feb. 25, 1936.  T. A. FEE, JR  2,032,007
EXPANSIBLE AND CONTRACTIBLE PISTON FOR LIQUID METERING CYLINDERS
Filed Aug. 27, 1934

INVENTOR
Thomas Arthur Fee Jr.
BY
ATTORNEY

Patented Feb. 25, 1936

2,032,007

UNITED STATES PATENT OFFICE 2,032,007

EXPANSIBLE AND CONTRACTIBLE PISTON FOR LIQUID METERING CYLINDERS

Thomas Arthur Fee, Jr., Vancouver, British Columbia, Canada, assignor to Gasoline Energy Distributors Limited, Vancouver, British Columbia, Canada, a corporation of British Columbia Application August 27, 1934, Serial No. 741,603
In Canada August 28, 1934

8 Claims. (Cl. 73—30)

This invention relates to an expansible and contractible piston of a type used in machines for measuring or metering liquids or like non-compressible fluids which may be caused to flow under pressure.

A primary object of this invention is to provide a piston which is capable of automatic adjustment in the nature of expansion and contraction in response to changes of temperature whereby the displacement of said piston within a cylinder may be varied automatically in proportion to variations in the temperature of the liquid which is contained within or being passed through the cylinder.

Another primary object of the invention is to provide a temperature controlled expansible and contractible piston wherein the piston is contracted in response to a rise of temperature and expanded in response to a lowering of temperature of a liquid which is being measured, the expansion and contraction of the piston being inverse to the expansion and contraction of the liquid.

Another object of the invention is to provide a temperature controlled expansible and contractible piston which is especially designed for use in fluid measuring or metering apparatus in which the piston is floatingly mounted in a measuring cylinder.

Laws and standards regulating the measuring of liquids define units of measure, such as gallons, quarts, pints and the like, as a certain volume of the liquid at a specified temperature. As liquids are expanded in volume by an increase in temperature and contracted in volume by a decrease in temperature, it is obvious that any given amount of liquid measured at a temperature higher than the specified standard temperature will be less than the amount called for by standard requirements, while any given amount of liquid measured at a temperature lower than the specified standard temperature will be greater than the amount called for by standard requirements. It is an object of this invention to provide a floating piston for use in a measuring or metering chamber, which piston is adapted to be automatically expanded and contracted in response to changes in the temperature of the liquid which is being measured or metered, whereby the delivery of exactly a standard amount of the liquid is always assured irrespective of the temperature at which the liquid is measured.

The above mentioned general objects of my invention, together with others inherent in the same, are attained by the device illustrated in the following drawing, the same being a preferred exemplary form of embodiment of my invention, throughout which drawing like reference numerals indicate like parts:

Figure 1:
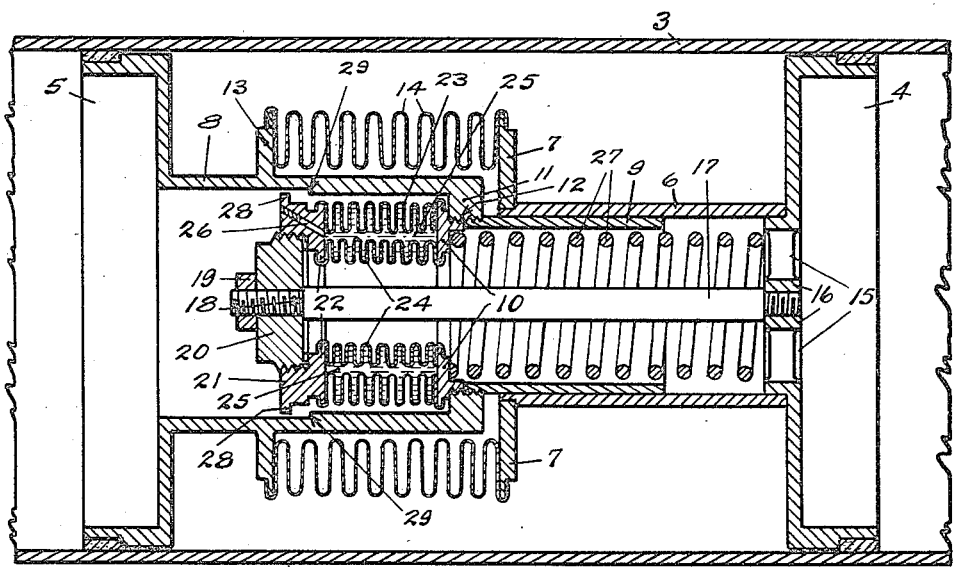
Figure 1 is a longitudinal sectional view of an expansible and contractible metering piston constructed in accordance with this invention, showing the same within a cylinder, a portion of which is broken away.

Referring to the drawing, 3 designates a cylinder within which an expansible and contractible piston is floatingly disposed. This expansible and contractible piston comprises two spaced apart piston head members 4 and 5, each snugly fitted within the cylinder so that liquid can not pass between the piston head members and the cylinder walls. A guide tube 6 is fixedly secured to the piston head member 4 perpendicularly and concentrically thereof and extends outwardly from the piston head member 4 toward the piston head member 5. An annular flange member 7 is rigidly connected with the end of the guide tube 6 and extends outwardly therefrom.

The piston head member 5 has a concentrically positioned rigidly connected, perpendicular, tubular portion 8 extending outwardly therefrom toward the piston head member 4. The outer end of this tubular portion 8 is rigidly connected with a smaller tubular member 9 which fits slidably and telescopically within the guide tube 6. An annular flange member 10 is positioned within the tubular portion 8 and fixedly secured to an inwardly directed flange portion 11, which is provided at the end of the tubular portion 8. The flange member 10 and smaller tubular member 9 are illustrated as screwed into the flange portion 11, as by threads 12, but it will be understood that they may be integral with the tubular member 9 or otherwise rigidly connected with said tubular member 9. A relatively fixed, external, annular flange 13 is provided on the tubular member 8 between the two ends thereof and in spaced relation from the flange 7 on the tubular member 6 and an expansible and contractible bellows like liquid tight housing 14 extends between said two flanges 7 and 13 and forms a liquid tight enclosure of variable length which prevents the escape of any liquid which may pass between the tubular members 6 and 9, and at the same time permits relative adjustment of piston head members 4 and 5 toward and away from each other.

The piston head member 4 is provided with passageways 15, which communicate with the interior of the tubular member 4, and is further provided with a central hub 16 to which an axially disposed piston rod 17 is rigidly connected. The piston rod 17 extends lengthwise through the tubular member 6 and into the tubular member 8 and is rigidly connected, as by a shoulder 18 and nut 19, with a center block 20 which screws into an annular thermostat head 21. Flange means 22 on the inner end of the thermostat head 21 is positioned in spaced relation as respects the flange member 10 and two liquid tight bellows like members 23 and 24 of thin sheet metal of good temperature conductive qualities extend between the flange means 22 and flange 10 and have their respective ends soldered or otherwise tightly secured to the flanges 10 and 22. The bellows like member 23 is of larger diameter than the bellows like member 24 and said two members 23 and 24 are positioned coaxially one within the other so as to leave an annular space 25 therebetween for the reception of a thermostatic liquid which is sealed within the two bellows like members and between the flange parts 10 and 22. The space 25 may be filled with liquid through an inlet opening 26 in the head 21 and the opening 26 may then be closed or sealed so as to preclude leakage.

A compression spring 27 is disposed within the tubular members 9 and 6 with one end pressing against the flange 10, and the other end pressing against the piston head member 4. This arrangement of the compression spring 27 provides a yielding pressure, urging the two piston head members 4 and 5 apart. Also the pressure of this spring 27 is exerted in one direction against the flange member 10 at one end of the thermostatic liquid chamber 25, and in an opposite direction against the flange member 22 at the other end of the thermostatic liquid chamber 25, due to the connection of the flange member 22 with the piston head member 4 through piston rod 17, center block 20, and thermostat head 21. This places the thermostatic liquid in the chamber 25 under a substantially constant pressure due to the expansive force of the spring 27. As the convolutions or corrugations of the thin sheet metal bellows like members 23 and 24 are relatively deep in radial directions, said bellows like members are substantially non-yielding in their resistance to force exerted in radial or circumferential directions, but yield readily to force exerted in longitudinal directions. Raising the temperature of this thermostatic liquid will cause it to expand, and lowering the temperature of this liquid will cause it to contract in accordance with well known physical laws. Expansion of such liquid will move the thermostat heads 10 and 22 farther apart, and such movement apart of the thermostat heads will contract the over all longitudinal dimension of the expansible and contractible piston by moving the piston head members 4 and 5 relatively closer together. In a similar manner lowering the temperature of the thermostatic liquid in the chamber 25 will produce contraction of said liquid and allow the spring 27 to move the thermostat head members or flanges 10 and 22 closer together. This will expand the over all dimensions of the piston by moving the piston head members 4 and 5 relatively further apart. It is thus seen that expansion of the thermostatic liquid in the chamber 25 will contract the metering piston and reduce the displacement of the same in the cylinder 3 while contraction of the thermostatic liquid in the chamber 25 will expand the metering piston and increase the displacement of said piston in the cylinder 3.

The thermostatic liquid in the chamber 25 preferably has substantially the same coefficient of expansion as the liquid which is being passed through the cylinder 3 in the operation of measuring or metering said liquid and may be the same liquid as that being metered. The liquid which is being measured is free to enter the tubular members 6, 8 and 9 and during operation is always in contact with the inside of the inner bellows like member 24 and the outside of the outer bellows like member 23. The temperature of this liquid which is being measured is thus very quickly communicated to the liquid in the chamber 25 at all times, and the piston is contracted in response to an increase of temperature of the liquid being measured and expanded in response to a decrease of temperature of the liquid being measured.

Sufficient space is left between the head 21 and the walls of the tubular member 8 to permit free access of the liquid which is being measured to the exterior of the outer bellows like member 23. Means for limiting the total amount of expansion or relative movement of the two piston head members 4 and 5 away from each other is provided in the form of shoulder means 28 on the thermostat head 21 adapted to engage with other shoulder means 29 in the tubular member 8. Engagement of the flange 7 and end of tubular member 6 with the internal flange 11 and end of the tubular member 8 serves to limit the contraction or relative movement of the piston head members 4 and 5 toward each other. In Fig. 1 the metering piston is shown about half way between the fully expanded and the fully contracted position.

Figure 2:
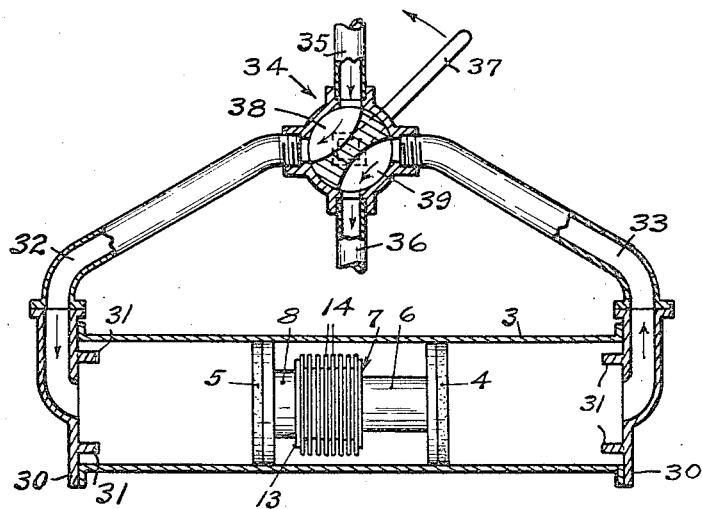
Fig. 2 is a somewhat diagrammatic view partly in section and partly in elevation, showing one adaptation of this piston to a measuring or metering machine.

Fig. 2 shows, somewhat diagrammatically, one operative installation of this expansible and contractible piston in a measuring device. Obviously the mechanism connected with the cylinder in which this piston is used may be varied as desired. In said Fig. 2, 30 are heads on the cylinder 3. 31 are stops provided on the heads to limit the movement, in both directions, of the piston. 32 and 33 are two pipes connected with opposite ends of the cylinder 3. 34 is a four way valve to which the pipes 32 and 33 are connected. 35 is an inlet pipe and 36 an outlet pipe, both connected with the four way valve 34. A handle 37 is provided on the four way valve by which it may be thrown from one position to another. If desired, automatically operated electromagnetic or air pressure valve control means of a form disclosed in Patent No. 1,932,976, issued to Harry Lamb and Thomas Arthur Fee, Jr., on October 31, 1933, may be used in connection with this invention.

In the operation of this device liquid capable of being caused to flow under relatively low pressure as compared to the pressure exerted by spring 27 is supplied under pressure through pipe 35 to the four way valve 34. When said valve is in the position shown in Fig. 2, liquid under pressure entering through pipe 35 will pass through a passageway 38 in said valve 34 and through the pipe 32 into the left hand end of the cylinder 3 and the metering piston will be moved to the right until it encounters the fixed stop 31 at the right hand end of the cylinder 3. During this time the pipe 33, which connects with the right hand end of the cylinder 3, will have been connected with the outlet pipe 36 through a passageway 39 in the four way valve 34. When the metering piston is at the limit of its movement toward the right hand end of the cylinder 3, a measured charge of liquid will be contained in the chamber to the left of said piston. If the valve 34 is then reversed to connect inlet pipe 35 with pipe 33, and discharge pipe 36 with pipe 32, liquid under pressure will then enter the right hand end of the cylinder 3 and move the metering piston toward the left, thus expelling, through pipe 32, passageway 38 and pipe 36, the measured charge of liquid taken in on the preceding stroke.

After the machine is in operation, a very accurately measured batch of liquid will be discharged at each stroke of the metering piston. As the movement of the metering piston is limited in both directions by positive stop means, it is obvious that contracting or shortening this metering piston will reduce the volumetric displacement of this piston in the cylinder and increase the maximum volume of the chamber which will be provided for inflowing liquid at the end of the piston stroke, thus allowing more liquid to be taken in and delivered at each stroke. In a similar manner expansion or longitudinal elongation of the piston will increase the volumetric displacement of the metering piston in the cylinder and decrease the maximum volume of the chamber provided for inflowing liquid at the end of the piston stroke, thus providing for the taking in and delivering of less liquid at each stroke.

By controlling the expansion and contraction of the metering piston in proportion to variations in the temperature of the liquid which is being measured, it is possible to automatically compensate for the expansion and contraction of this liquid, due to changes of temperature, and to always deliver the amount of liquid called for by standard requirements, irrespective of expansion and contraction of the liquid produced by temperature changes.

Obviously, changes may be made in the forms, dimensions and arrangement of the parts of my invention, without departing from the principle thereof, the above setting forth only preferred forms of embodiment.

I claim:

1. In an expansible and contractible piston, two piston head members movable toward and away from each other; means operable by a rise in temperature; and piston head moving devices connecting said temperature operable means and said piston head members and relatively moving said piston head members toward each other in response to operation of said temperature operable means by a rise in temperature.

2. In an expansible and contractible piston, two piston head members movable toward and away from each other; thermostatic means expansible in response to a rise in temperature; and piston head moving devices connecting said thermostatic means and said piston head members and relatively moving said piston head members toward each other in response to expansion of said thermostatic means by a rise in temperature.

3. In an expansible and contractible metering piston, two piston head members movable toward and away from each other; thermostatic means movable by a variation in temperature; piston head moving devices operatively connected with said piston head members and with said thermostatic means and relatively moving said piston head members toward each other in response to movement of said thermostatic means by a rise in temperature; and other means operatively connected with said piston head members and controlled by said thermostatic means and moving said piston heads relatively apart in response to movement of said thermostatic means due to a decrease in temperature.

4. In an expansible and contractible metering piston, two piston head members movable toward and away from each other; thermostatic means movable by a rise in temperature; piston head moving devices operatively connected with said piston head members and with said thermostatic means and relatively moving said piston head members toward each other in response to movement of said thermostatic means by a rise in temperature; and resilient means urging said piston head members relatively apart.

5. In an expansible and contractible metering piston, two spaced apart piston head members movable toward and away from each other; two tubular guide members on adjacent sides of said piston head members slidable telescopically relative to each other; thermostatic means movable by a rise in temperature and subject to contact with liquid on both sides of said metering piston; piston head moving devices operatively connected with said piston head members and with said thermostatic means and moving said piston head members relatively toward each other in response to movement of said thermostatic means by a rise in temperature; and resilient means urging said piston head members relatively apart.

6. In a longitudinally expansible and contractible metering piston, two piston head members positioned in spaced apart relation; tubular telescopic guide means connecting said two piston head members; a temperature responsive thermostat member positioned within said guide means and expansible longitudinally of said guide means in response to a rise in temperature; means connecting one piston head member with the end of the temperature responsive member furthest removed therefrom; and means connecting the other piston head member with the other end of said temperature responsive member.

7. In a longitudinally expansible and contractible metering piston, two piston head members positioned in spaced apart relation; two tubular guide members rigid with said piston head members and extending from adjacent sides of said piston head members toward each other, the piston head members having openings therethrough communicating with the interiors of the tubular guide members; temperature responsive thermostat means comprising a larger and a smaller bellows like fluid tight member positioned one within the other affording an annular chamber therebetween containing thermostatic fluid; a thermostat head member having a fluid tight connection with one end of said two bellows like members; a piston rod connected with said thermostat head member and extending axially through said inner bellows like member and secured to the piston head member at the opposite end of the temperature responsive means from said thermostat head member; a flange member forming a thermostat head at the other end of said two bellows like members and secured to the tubular member of the other piston head member; and a spring urging said two piston members apart.

8. In a longitudinally expansible and contractible metering piston, two piston head members disposed in spaced apart relation; two concentrically positioned tubular guide members rigidly connected with said piston head members and extending from adjacent sides of said piston head members at right angles therefrom and having their end portions telescopically disposed one within the other, the piston head members having openings therethrough communicating with the interiors of the tubular guide members; two annular flange members secured to the exterior of said tubular guide members in spaced apart relation; a longitudinally extensible bellows like member of liquid tight construction having its opposite ends secured to said flange members by liquid tight joints, said bellows like member preventing the escape of liquid which may leak between the telescoped portions of said tubular members; temperature responsive thermostat means comprising a larger and a smaller bellows like fluid tight member positioned one within the other affording an annular chamber therebetween containing thermostatic fluid; a thermostat head member having a fluid tight connection with one end of said two bellows like members; a piston rod connected with said thermostat head member and extending axially through said inner bellows like member and secured to the piston head member at the opposite end of the temperature responsive means from said thermostat head member; a flange member forming a thermostat head at the other end of said two bellows like members and secured to the tubular member of the other piston head member; and a spring urging said two piston members apart.

THOMAS ARTHUR FEE, Jr.